Jan. 27, 1925.
B. KNAEBEL
CUTTING SEAMLESS HOLLOW BODIES
Filed May 20, 1924
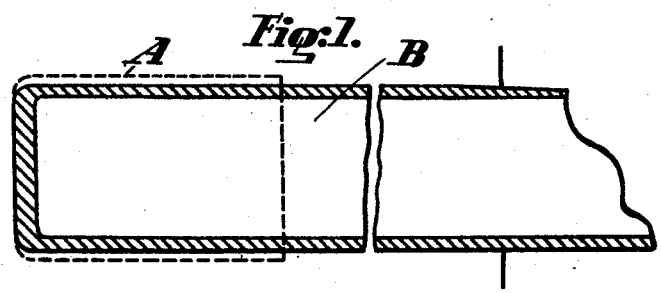
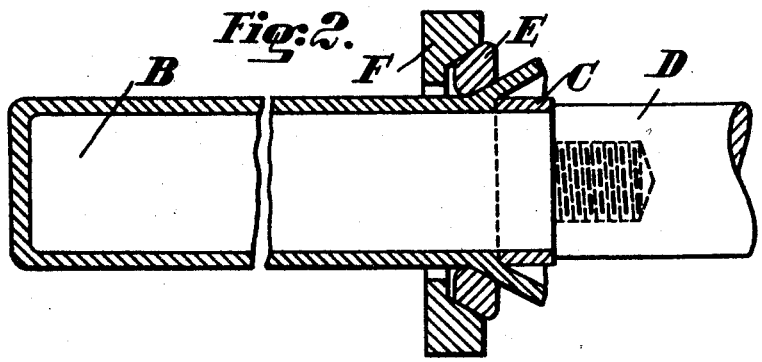
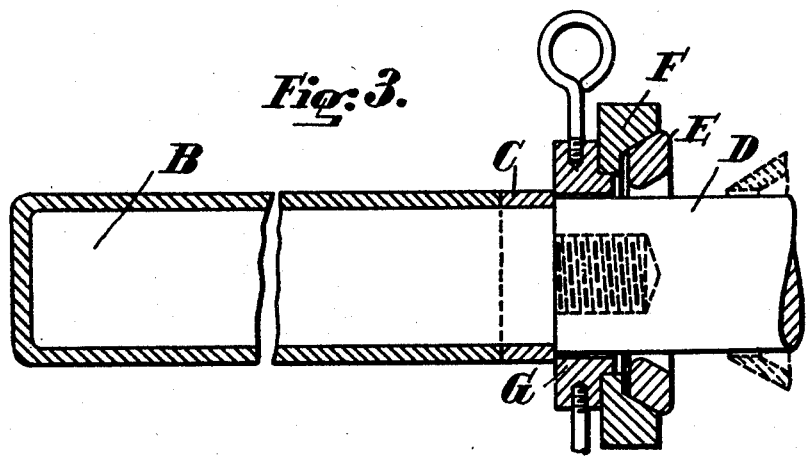
Inventor:
Benedikt Knaebel
By [signature]
Attorney Patented Jan. 27, 1925.

1,524,183

UNITED STATES PATENT OFFICE.

BENEDIKT KNAEBEL, OF DUSSELDORF, GERMANY, ASSIGNOR TO RHEINISCHE METALLWAAREN-UND MASCHINENFABRIK, OF DUSSELDORF-DERENDORF, GERMANY, A CORPORATION OF GERMANY.

CUTTING SEAMLESS HOLLOW BODIES.

Application filed May 20, 1924. Serial No. 714,660.

*To all whom it may concern:*

Be it known that I, BENEDIKT KNAEBEL, a citizen of Germany, residing at Dusseldorf, Germany, Geistenstrasse 3, have invented certain new and useful Improvements in Cutting Seamless Hollow Bodies, of which the following is a specification.

When seamless tubes or other hollow bodies are drawn according to known drawing processes by means of a mandrel and drawing ring or rings, there is usually an irregular formation at the end of the tube last drawn through the ring. One side or various parts of that end are longer than the other side or the other parts, and also at the end the thicknesses of the walls of the tube vary around the circumference of the mandrel; on the one side or at various places they are thinner, almost to the extent of being cut through, and thicker on the other side or at other places. Corners drawn out to a greater or less extent occur when hollow bodies, as often happens, are pressed out from ingots of square cross section. Irregularities at the end of the tube also occur when the ingots are not of rectangular but of circular cross section.

These irregularities in the formation of the tube make the stripping off of the drawn member more difficult, since the material of the drawn tube frequently jams at the thin parts between the mandrel and the stripper with the result that, in consequence of the time lost thereby, the tube is still more firmly jammed on the mandrel and can only be removed from the mandrel by special processes which waste more time. When the tube, with or without difficulty, has been stripped off, it is always necessary that the end of the tube last drawn should then be trimmed at right angles to its axis, in order that a true end surface may be formed for the further working up of the tube, in case it has to undergo further mechanical operations, for example in the lathe, or in case further drawing operations either hot or cold are required. On account of the irregular formation of the end of the tube it is almost always necessary to cut off the tube in an intermediate stage of the operations and in many cases this necessitates its being carried backwards and forwards to and from the drawing works.

These drawbacks are obviated according to the invention as follows:—

The irregular end is cut off during the drawing process while the tube is on the mandrel, and after the tube has been stripped from the mandrel, a tube of the required length is thus obtained cut off exactly at right angles to the longitudinal axis, and which without any further processes can, for example, be placed on the lathe or undergo succeeding drawing operations.

In the accompanying drawing: Figure 1 is a view illustrating the above-mentioned irregularities in the formation of the tube, and also showing, in dotted lines, the hollow body in its first stage.

Figs. 2 and 3 illustrate two successive stages of the process according to the present invention, and also show the preferred form of apparatus or device for carrying out the same.

Referring to Fig. 1, the hollow body A is placed in the usual manner on the mandrel B and is drawn out to a long hollow body or tube by drawing the mandrel with the work through one or more drawing rings arranged one behind the other. The cutting ring C is arranged on the mandrel B. It lies against a shoulder or projection of the mandrel itself or of the shaft D. The ring C can be moved to and fro on the free length of the mandrel and may be slid from it. This is for the purpose of replacing it for a new one or for sharpening it when the edge becomes dull. In addition its removability allows any desired number of rings to be placed on the mandrel and such rings can be of any suitable width depending upon the exact location desired to cut the tube or depending upon the length of the tube. In other words, a number of cutting rings or a single ring can be used depending upon the length of the tube so that very little of the tube need be wasted as the cut-off portion. Heretofore it was necessary to keep a large supply of mandrels on hand which, of course, is expensive, but when cutting rings are used it is only necessary to keep on hand a few mandrels and a number of cutting rings of different widths. Its outer diameter is the same as that of the inner diameter of the drawing ring E or may be less than the inner diameter of the last drawing ring E by a small amount which allows the ring C to pass through the ring E. The inner edge of the drawing ring E and the outer edge of the cutting ring C work together like the blades of other cutting devices. On drawing out the tube, when the work has passed the last drawing ring, the end of the tube lying beyond the drawing ring spreads out against the cutting ring and, as the movement is continued, this end spreads out against the ring somewhat as shown in Fig. 2. On the further approach of the cutting ring to the reduced internal part of the drawing ring, the material of the tube is pressed into the sharp corner formed by the mandrel and the cutting ring. This corner is then entirely filled and the end of the tube is forced over the cutting ring and separated from it with a cylindrical end surface corresponding to the width of the drawing ring, and is drawn backwards on the shaft of the mandrel, as shown in dotted lines in Fig. 3. The projection on the mandrel or the shaft D of the mandrel, which supports the cutting ring during the work and determines its position relatively to the mandrel and therewith the length of the cut off tube, has a diameter which is less than the outer diameter of the cutting ring. A shoulder is consequently formed at the rear side. This shoulder lies during the return stroke of the mandrel against a stripper G (Fig. 3) between it and the draw ring support F, so that the tube is stripped off by the stripper on the return movement of the mandrel. The projection on the mandrel or the mandrel shaft forming the shoulder for the cutting ring need not extend over the whole length of the mandrel. Alternatively, a ring can be placed on the mandrel and can be secured by a screw-thread or other suitable means. In this way it is possible within certain limits to alter the position of the cutting ring and, for example, to bring the front edge of the cutting ring again to the same position, if it has been shortened in consequence of wear.

The arrangement as described and which forms a preferred construction, embodies the use of a loose cutting ring. This cutting ring, which is loose on the mandrel and can be moved to and fro and slid off it, is not absolutely necessary. Obviously, an annular front edge formed of the material of the mandrel itself, or the shoulder formed by the mandrel shaft, can be utilized as the cutting edge. The drawn hollow member that has been cut off to the required length can then be stripped off by stripping devices other than those described.

Having thus described the nature of the said invention and the best means I know of carrying the same into practical effect, I claim:—

1. Cutting apparatus for cutting seamless hollow tubes while said tubes are on a mandrel comprising a cutting ring on said mandrel for cutting the end of the tube from the finished portion.

2. Cutting apparatus for cutting seamless hollow tubes comprising a mandrel on which the tubes are drawn through a drawing ring, said mandrel having a shoulder thereon; and a cutting ring on said mandrel adapted to abut against said shoulder for cutting the end of the tube from the finished portion while said tube is being drawn.

In testimony whereof I have affixed my signature in presence of two witnesses.

BENEDIKT KNAEBEL.

Witnesses:
HENRY W. HAAS,
M. TOHR.